(12) United States Patent
Yamauchi et al.

(10) Patent No.: US 8,394,887 B2
(45) Date of Patent: Mar. 12, 2013

(54) FLUOROPOLYMER HAVING S-SULFATE GROUP AND WATER/OIL REPELLENT COMPOSITION CONTAINING THE POLYMER

(75) Inventors: Kiyoshi Yamauchi, Osaka (JP); Shinichi Minami, Settsu (JP); Ikuo Yamamoto, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 103 days.

(21) Appl. No.: 11/912,714

(22) PCT Filed: Apr. 6, 2006

(86) PCT No.: PCT/JP2006/307356
§ 371 (c)(1),
(2), (4) Date: Jan. 18, 2008

(87) PCT Pub. No.: WO2006/117973
PCT Pub. Date: Nov. 9, 2006

(65) Prior Publication Data
US 2008/0287625 A1 Nov. 20, 2008

(30) Foreign Application Priority Data
Apr. 27, 2005 (JP) ................................. 2005-129577

(51) Int. Cl.
*C08L 27/12* (2006.01)
*C08F 18/20* (2006.01)
*C08F 12/30* (2006.01)

(52) U.S. Cl. ......... 524/544; 526/243; 526/245; 526/287

(58) Field of Classification Search .................. 526/245, 526/243, 287; 560/308; 524/544
See application file for complete search history.

(56) References Cited

U.S. PATENT DOCUMENTS

| | | | | |
|---|---|---|---|---|
| 3,349,063 A * | 10/1967 | Mayer et al. | .................. | 526/220 |
| 3,706,706 A * | 12/1972 | Vandenberg | .................. | 525/403 |
| 5,520,962 A * | 5/1996 | Jones, Jr. | .................. | 427/393.4 |
| 5,798,406 A | 8/1998 | Feret et al. | | |
| 5,985,514 A | 11/1999 | Zheng et al. | | |
| 6,136,503 A * | 10/2000 | Zheng et al. | ................ | 430/270.1 |
| 6,420,505 B1 | 7/2002 | Blevins et al. | | |
| 6,753,376 B1 * | 6/2004 | Yamana et al. | ................ | 524/544 |
| 2003/0013830 A1 | 1/2003 | Blevins et al. | | |
| 2003/0207202 A1 * | 11/2003 | Fujita et al. | ................. | 430/270.1 |
| 2003/0231236 A1 | 12/2003 | Wexler et al. | | |
| 2003/0236369 A1 * | 12/2003 | Komoriya et al. | ............ | 526/246 |

FOREIGN PATENT DOCUMENTS

| | | |
|---|---|---|
| DE | 1143330 A | 2/1963 |
| JP | 58185605 A | 10/1983 |
| JP | 05017538 A | 1/1993 |
| JP | 06136062 A | 5/1994 |
| JP | 08208936 A | 8/1996 |
| JP | 2000026539 A | 1/2000 |
| JP | 2000-94846 | 4/2000 |

OTHER PUBLICATIONS

Xuan Sun, et al.; "Polymers Bearing an S-Sulfate Side Chain. Oxidative Crosslinking of the Copolymer of Vinyl Mercaptoacetate S-Sulfate and 2-Hydroxyethyl Acrylate"; Macromolecular Rapid Communications 2001; 22, No. 6; 2001; pp. 401-404.

K. Yamauchi, et al.; "Polymer Engineering"; No. 50; 2001; pp. 8-19 ((152)-(19)).

Von H. Disiler; "Zur Chemie der Buntesalze"; Angew. Chem.; 79 Jahrg 1967; Nr 11; pp. 520-529.

Hans Bunte; "Zur Constitution der unterschwefligen Säure"; Chem. Ber. 7; 1874; pp. 646-649.

* cited by examiner

*Primary Examiner* — Nicole M Buie-Hatcher
(74) *Attorney, Agent, or Firm* — Sughrue Mion, PLLC

(57) ABSTRACT

A fluoropolymer comprising: (A) repeating unit derived from an S-sulfate monomer having an —S—$SO_3$— group and carbon to carbon double bond; and (B) repeating unit derived from a fluoromonomer having a fluorine atom and carbon to carbon double bond. This fluoropolymer can be a constituent of water/oil repellent agent having excellent water/oil repelling capability, and is stable in air and permits an arbitrary control of crosslinking.

15 Claims, 3 Drawing Sheets

Figure 1:
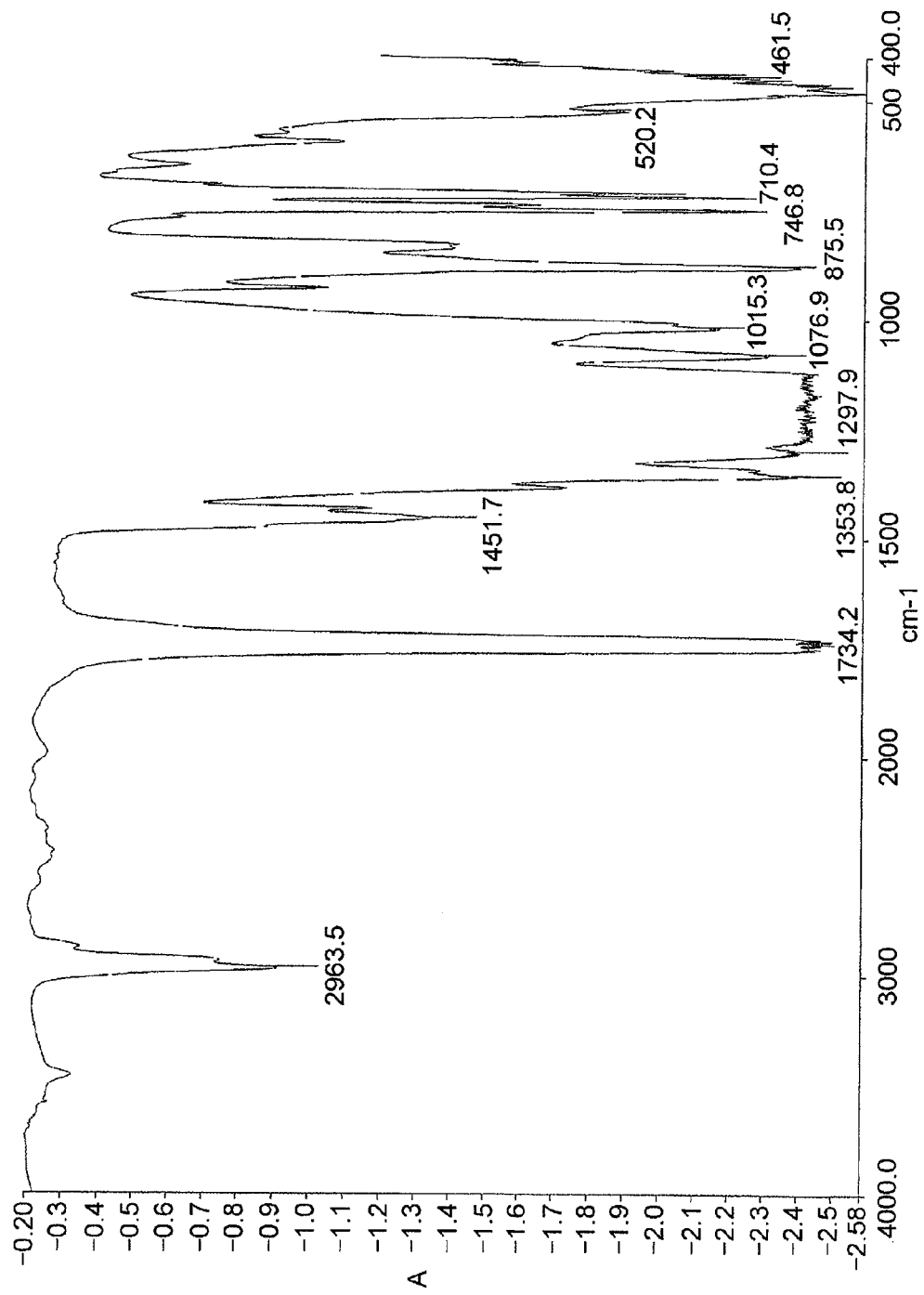

FLUOROPOLYMER HAVING S-SULFATE GROUP AND WATER/OIL REPELLENT COMPOSITION CONTAINING THE POLYMER

FIELD OF THE INVENTION

The present invention relates to a novel fluorine-containing oxidatively crosslinkable polymer and a treatment composition, particularly a surface treatment composition comprising said polymer, which impart excellent water repellency, oil repellency and soil resistance to a textile such as a carpet, a paper, a non-woven fabric, a masonry, an electrostatic filter, a dust protective mask, and a part of fuel cell.

BACKGROUND ART

The compounds having an S-sulfate group or an S—$SO_3^-$ $Na^+$ group were firstly synthesized by Bunte in 1874 and thus are called as "Bunte salts" (cf. H. Bunte, Chem. Ber. 7, 646 (1874)). The Bunte salts are synthesized by the reaction between an alkyl halide and sodium thiosulfate (cf., for example, H. Distler, Angew. Chem. 79, 520 (1967)). This S-sulfate group is oxidized to easily form an S—S bond, but it is relatively stable against air oxidation. While the synthesis of a monomer having an S-sulfate group (cf., for example, German Patent No. 114330: X, Sun, K. Yamauchi, Macromol. Papid. Commun. 22, 401 (2001)) and the polymerization thereof (cf., for example, JP-A-2000-94846: U.S. Patent Laid-Open Publication No. 2003-231236) have been studied, such a polymer is insufficient to be used for a water- and oil-repellent agent.

In addition, vinyl mercaptacetate sodium salt (VMAS) (X, Sun, K. Yamauchi, Marcromol. Rapid. Commun. 22, 401 (2001)) has problems in its low radical polymerizability since it is an unconjugated monomer.

Further, an SH group known as a conventional oxidation crosslinking group is easily oxidized by an air to form an S—S bond, and therefore, the synthesis of an SH group-containing polymer, particularly the production and isolation of said polymer in a solid state have been difficult (cf. K. Yamauchi, Polymer Engineering, 50, 9 (2001)).

DISCLOSURE OF THE INVENTION

Problems to be Solved by the Invention

An object of the present invention is to provide a water- and oil-repellent agent which can impart excellent water- and oil-repellency.

A further object of the present invention is to provide a fluorine-containing crosslinkable polymer constituting such a water- and oil-repellent agent, which is stable in air and which can arbitrarily control the crosslinking.

Means for Solving the Problems

The present invention provides a fluorine-containing polymer comprising:
(A) repeating units derived from an S-Sulfate monomer having an —S—$SO_3$— group and a carbon-carbon double bond, and
(B) repeating units derived from a fluorine-containing monomer having a fluorine atom and carbon-carbon double bond.

The fluorine-containing polymer of the present invention is crosslinkable. The fluorine-containing polymer can easily generate an S—S linkage by an oxidation treatment and is crosslinked.

EFFECTS OF THE INVENTION

According to the present invention, a fluorine-containing polymer having an S-Sulfate group which is a crosslinkable, particularly oxidatively crosslinkable group can be prepared, and the generation of an S—S crosslink can provide a polymer having excellent water- and oil-repellency.

BRIEF DESCRIPTION OF THE INVENTION

Figure 2:
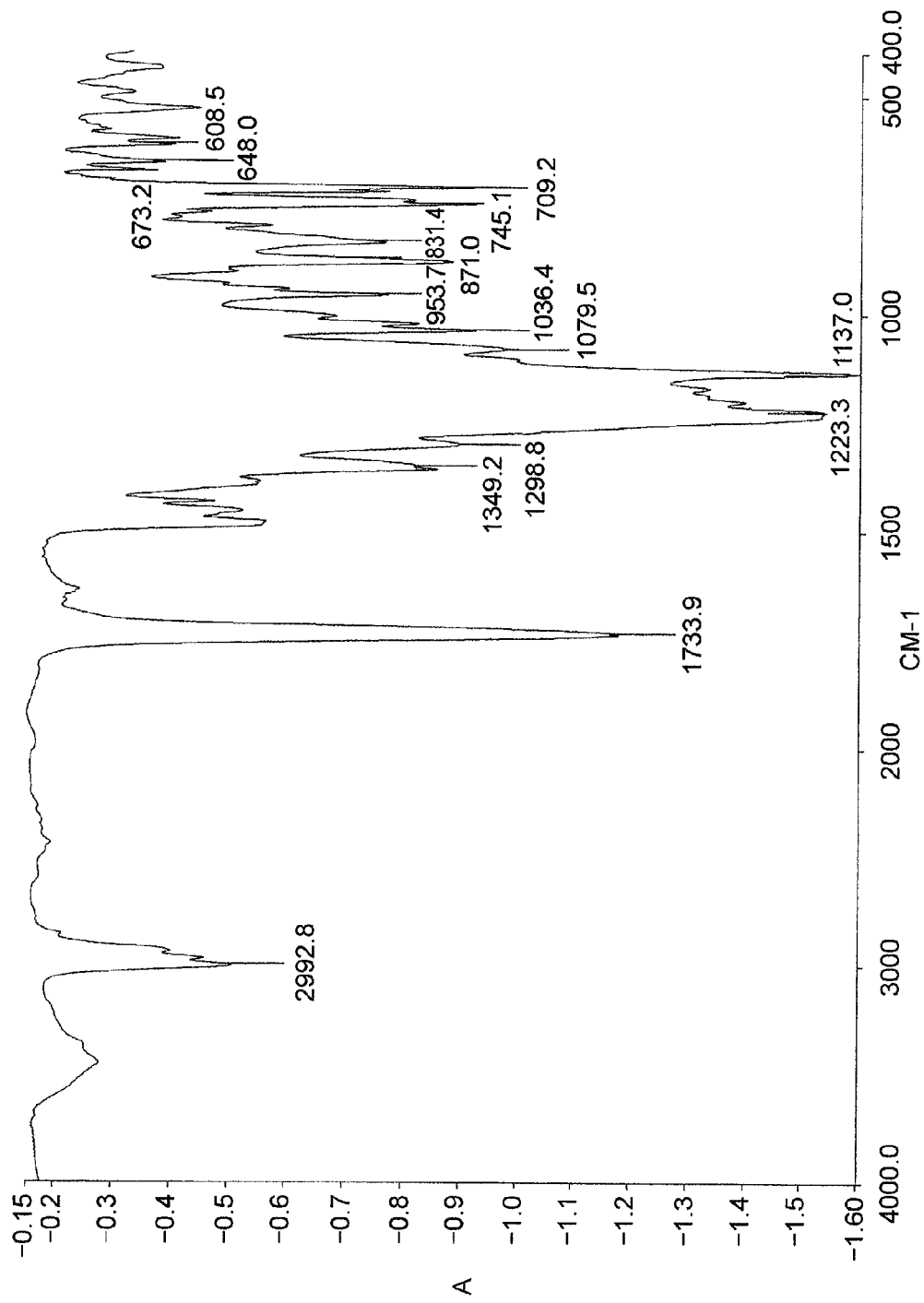
Figure 3:
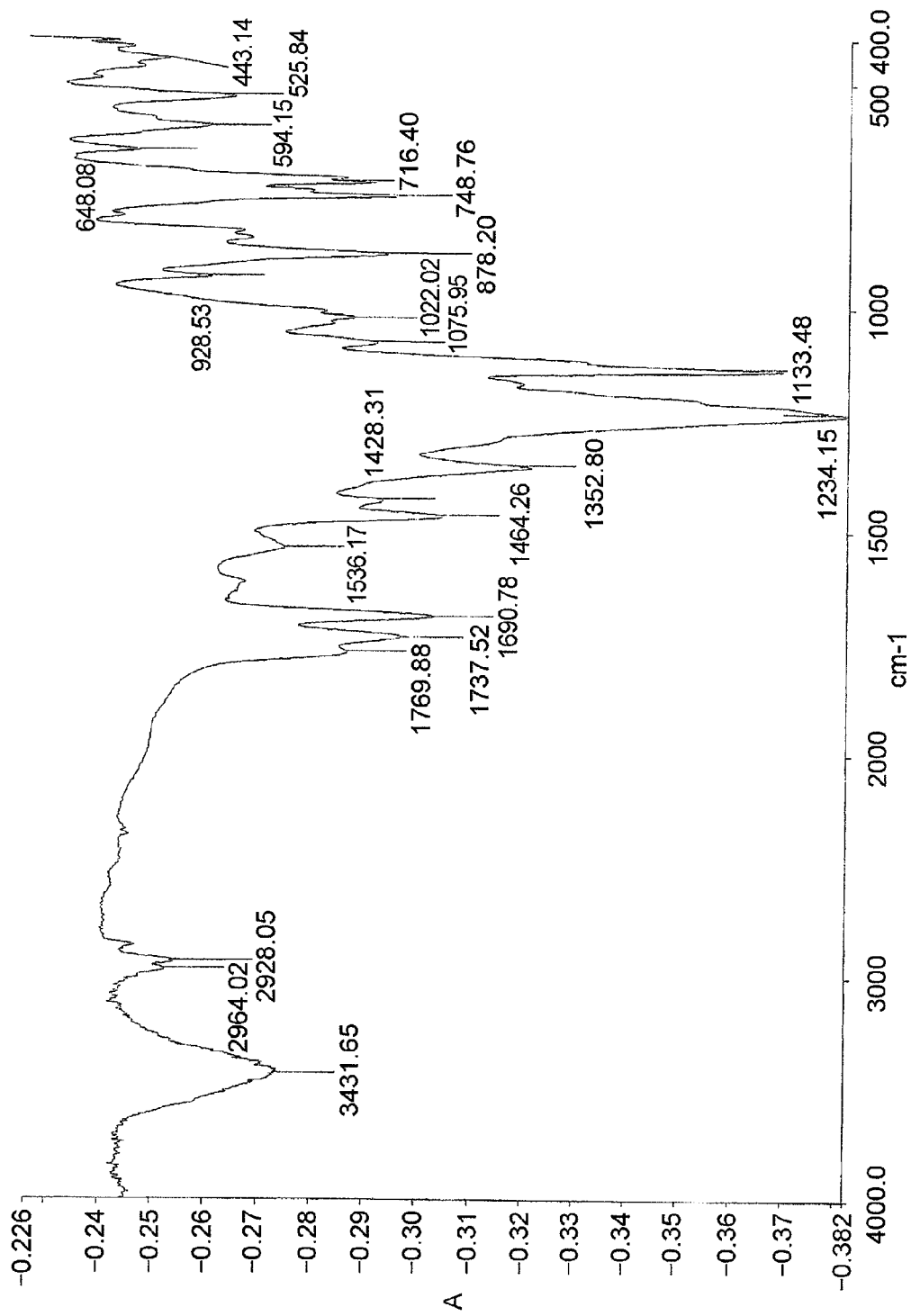

FIG. 1 is an IR spectrum chart of a copolymer obtained in Preparative Example 4.
FIG. 2 is an IR spectrum chart of a copolymer obtained in Preparative Example 5.
FIG. 3 is an IR spectrum chart of a copolymer obtained in Preparative Example 6.

PREFERRED MODE OF CARRYING THE INVENTION

The fluorine-containing polymer (fluorine-containing copolymer) of the present invention comprises an S-Sulfate monomer (A) and a fluorine-containing monomer (B).

The S-Sulfate monomer (A) is preferably of the formula:

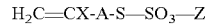
$$H_2C=CX\text{-}A\text{-}S\text{—}SO_3\text{—}Z$$

wherein X is a hydrogen atom, a methyl group, a fluorine atom, a chlorine atom, a bromine atom, a iodine atom, a $CFX^1X^2$ group (in which $X^1$ and $X^2$ respectively represent a hydrogen atom, a fluorine atom or a chlorine atom), a cyano group, a linear or branched fluoroalkyl group having 1 to carbon atoms, a substituted or unsubstituted benzyl group, or a substituted or unsubstituted phenyl group; A is -Ph-Y— or —COO—Y— (Ph is a phenylene group optionally having a substituent, Y is a direct bond, an $C_1$-$C_{10}$ aliphatic group optionally having an oxygen atom, a $C_6$-$C_{10}$ aromatic, cycloaliphatic or araliphatic group optionally having an oxygen atom, a —$CH_2CH_2N(R^1)SO_2$— group (in which $R^1$ is an alkyl group having 1 to 4 carbon atoms) or a —$CH_2CH(OY^1)$ $CH_2$— group (in which $Y^1$ is a hydrogen atom or an acetyl group.)), and
Z is a hydrogen atom or a metal atom.

In the S-Sulfate monomer (A), X may be a fluorine atom, a chlorine atom, a bromine atom, a iodine atom, a $CFX^1X^2$ group (in which $X^1$ and x respectively represent a hydrogen atom, a fluorine atom or a chlorine atom), a cyano group, a linear or branched fluoroalkyl group having 1 to carbon atoms, a substituted or unsubstituted benzyl group, or a substituted or unsubstituted phenyl group. That is, X may not be a hydrogen atom or a methyl group.

The vinyl group and the A group may be bonded at the p-position, o-position or m-position in the phenylene group. Preferable is p-phenylene.

Preferable example of the Y group is —$(CH_2)_n$— (n is from 1 to 10, preferably from 1 to 4).

Z is a hydrogen atom or metal atom. The metal atom is preferably monovalent metal atom, particularly an alkaline metal atom. Examples of the metal atom include sodium, lithium and potassium. Z is a cation in the S-Sulfate monomer and the polymer comprising the same.

Representative examples of the S-Sulfate monomer (A) include the followings:

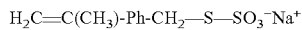

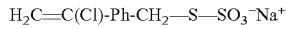

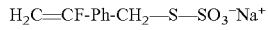

wherein, Ph is p-, o- or m-phenylene group, particularly p-phenylene group.

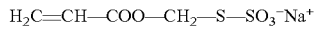

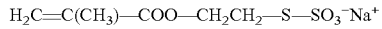

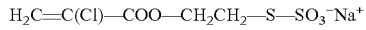

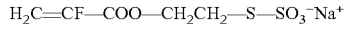

The S-Sulfate monomer (A) can be prepared, for example, as follows:

An alkyl halide and sodium thiosulfate pentahydrate which are in the form of a solution in water or in a mixture of water/organic solvent were charged and reacted with stirring at the temperature of 10° C. to 100° C. for 1 to 100 hours. As the alkyl halide, a halide such chlorides, bromide and iodides can be used. Specific examples of the alkyl halide include p-chloromethylstyrene, 2-bromoethyl methacrylate. As the organic solvent, a water-soluble organic solvent, for example, an alcohol such as methanol, ethanol and isopropyl alcohol can be used. The amount of sodium thiosulfate pentahydrate may be at least 1 mol, for example, from 1.0 mol to 1.5 mol, based on 1 mol of the alkyl halide. When an alkyl halide having a polymerizable group such as acryl group is used, it is preferable to add a polymerization inhibitor in a reaction solution. As the polymerization inhibitor, for example, t-butylcatechol, hydroquinone, hydroquinone monomethyl ether, and phenothiazine can be used. The polymerization inhibitor may be used, for example, in the amount of 1 to 1,000 ppm, based on the alkyl halide.

The fluorine-containing monomer (B) is preferably a fluorine-containing (meth)acrylate ester. The fluorine-containing monomer (B) is not limited and the example thereof may be of the formula:

$$CH_2=C(-X)-C(=O)-A-Rf$$

wherein X is a hydrogen atom, a linear or branched alkyl group having 1 to 21 carbon atoms, a fluorine atom, a chlorine atom, a bromine atom, a iodine atom, a $CFX^1X^2$ group (in which $X^1$ and $X^2$ respectively represent a hydrogen atom, a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group; A is $-O-Y^1-$ (in which $Y^1$ is an aliphatic group having 1 to 10 carbon atoms, an aromatic or cycloaliphatic group having 6 to 10 carbon atoms, a $-CH_2CH_2N(R^1)SO_2-(CH_2CH_2)_a-$ group (in which $R^1$ is an alkyl group having 1 to 4 carbon atoms, and a is 0 or 1.), a $-CH_2CH(OR^{11})CH_2-$ group (in which $R^{11}$ is a hydrogen atom or an acetyl group.) or $-(CH_2)_nSO_2-$ group (in which n is 1 to 10)), or $-Y^2-[-(CH_2)_m-Z-]_p-(CH_2)_n-$ (in which $Y^2$ is $-O-$ or $-NH-$; Z is $-S-$ or $-SO_2-$; m is 1 to 10, n is 0 to 10, and p is 0 or 1.), and Rf is a fluoroalkyl group having 1 to 21 carbon atoms, a fluoroalkenyl group having 1 to 21 carbon atoms, or a fluoroether group having total number of 1 to 200 of at least one repeating unit selected from the group consisting of $-C_3F_6O-$, $-C_2F_4O-$ and $-CF_2O-$.

The fluorine-containing monomer (B) is preferably of the formula:

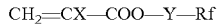

wherein X is a hydrogen atom, a methyl group, a fluorine atom, a chlorine atom, a bromine atom, a iodine atom, a $CFX^1X^2$ group (in which $X^1$ and x respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

Y is a direct bond, an $C_1$-$C_{10}$ aliphatic group optionally having an oxygen atom, a $C6$-$C_{10}$ aromatic, cycloaliphatic or araliphatic group optionally having an oxygen atom, a $-CH_2CH_2N(R^1)SO_2-$ group (in which $R^1$ is an alkyl group having 1 to 4 carbon atoms) or a $-CH_2CH(OY^1)CH_2-$ group (in which $Y^1$ is a hydrogen atom or an acetyl group.)), and Rf is a linear or branched fluoroalkyl group having 1 to 21 carbon atoms, a linear or branched fluoroalkenyl group having 1 to 21 carbon atoms, or a fluoroether group having total number of 1 to 200 of at least one repeating unit selected from the group consisting of $-C_3F_6O-$, $-C_2F_4O-$ and $-CF_2O-$.

In the fluorine-containing monomer (B), X may be a fluorine atom, a chlorine atom, a bromine atom, a iodine atom, a $CFX^1X^2$ group (in which $X^1$ and $X^2$ respectively represent a hydrogen atom, a fluorine atom, a chlorine atom, a bromine atom or a iodine atom), a cyano group, a linear or branched fluoroalkyl group having 1 to 20 carbon atoms, a substituted or unsubstituted benzyl group, or a substituted or unsubstituted phenyl group. That is, X may not be a hydrogen atom or a methyl group.

When the Rf group is the fluoroalkyl group, it is preferably a perfluoroalkyl group. The carbon number in the Rf group is from 1 to 21, for example, from 1 to 15. The upper limit of the Rf group may be 6, 5 or 4. Examples of the Rf group include $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, $-(CF_2)_3CF(CF_3)_2$, $-(CF_2)_4CF(CF_3)_2$, $-(CF_2)_7CF_3$, $-(CF_2)_5CF(CF_3)_2$, $-(CF_2)_6CF(CF_3)_2$, $-(CF_2)_9CF_3$, $-(CF_2)_2H$, $-CF_2CFHCF_3$, $-(CF_2)_4H$, $-(CF_2)_6H$, $-(CF_2)_8H$, and $-(CF_2)_{10}H$.

When the Rf group is the fluoroalkenyl group, examples of the Rf group include $-C(CF(CF_3)_2)=C(CF_3)(CF_2CF_2CF_3)$, $-C(CF(CF_3)_2)=C(CF_3)(CF(CF_3)_2)$ and $-C(CF_3)=C(CF(CF_3)_2)_2$.

When the Rf group is the fluoroether group, examples of the Rf group include $F(CF_2CF_2CF_2O)_aCF_2CF_2-$, and $F(CF(CF_3)CF_2O)_aCF(CF_3)-$ wherein "a" is, on average, from 2 to 100, particularly from 5 to 50, for example, 25.

Y is a direct bond, an $C_1$-$C_{10}$ aliphatic group optionally having an oxygen atom, a $C_6$-$C_{10}$ aromatic, cycloaliphatic or araliphatic group optionally having an oxygen atom, a $-CH_2CH_2N(R^1)SO_2-$ group (in which $R^1$ is an alkyl group having 1 to 4 carbon atoms) or a $-CH_2CH(OY^1)CH_2-$ group (in which $Y^1$ is a hydrogen atom or an acetyl group.). The aliphatic group is preferably an alkylene group (having particularly 1 to 4, for example, 1 or 2 carbon atoms). The aromatic and cycloaliphatic groups may be substituted or unsubstituted.

Examples of the fluorine-containing monomer include the followings:

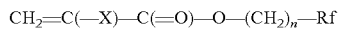

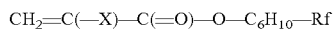

(—C$_6$H$_{10}$— is a divalent cyclohexane group.)

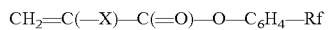

(—C$_6$H$_4$— is a divalent benzene group.)

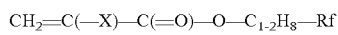

(—C$_{12}$H$_8$— is a divalent biphenyl group.)

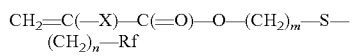

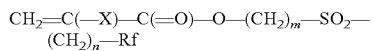

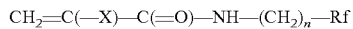

wherein X is a hydrogen atom, a linear or branched alkyl group having 1 to 21 carbon atoms, a fluorine atom, a chlorine atom, a bromine atom, a iodine atom, a CFX$^1$X$^2$ group (in which X$^1$ and X$^2$ respectively represent a hydrogen atom, a fluorine atom or a chlorine atom), a cyano group, a linear or branched fluoroalkyl group having 1 to 21 carbon atoms, a substituted or unsubstituted benzyl group, or a substituted or unsubstituted phenyl group;

Rf is a fluoroalkyl group having 1 to 21 carbon atoms, a linear or branched fluoroalkenyl group having 1 to 21 carbon atoms, or a fluoroether group having total number of 1 to 200 of at least one repeating unit selected from the group consisting of —C$_3$F$_6$O—, —C$_2$F$_4$O— and —CF$_2$O—; and m is from 1 to 10, and n is from 0 to 10.

Examples of the fluorine-containing monomer are as follows:

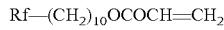

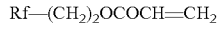

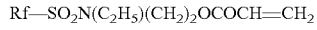

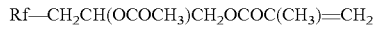

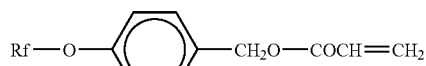

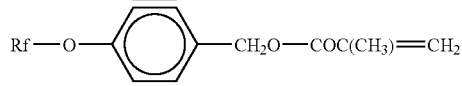

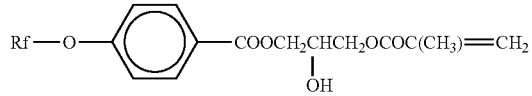

-continued

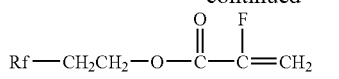

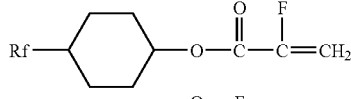

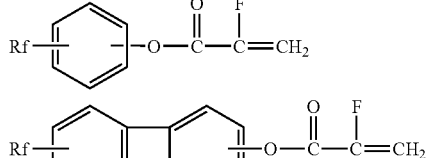

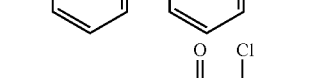

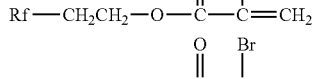

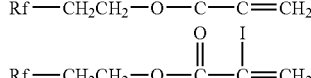

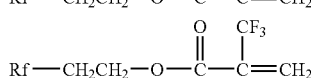

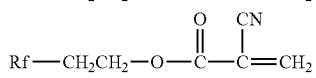

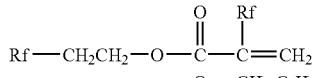

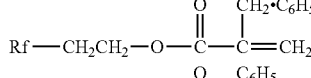

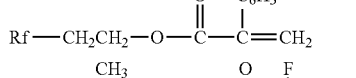

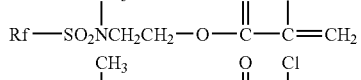

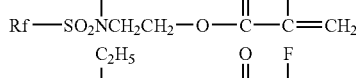

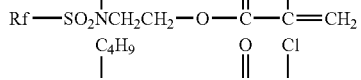

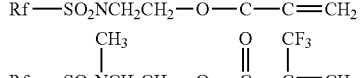

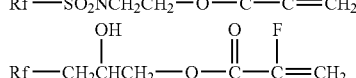

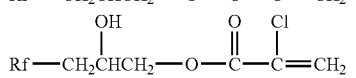

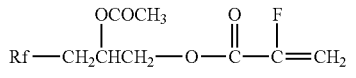

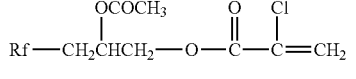

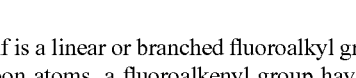

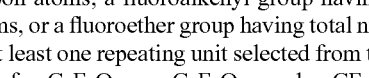

Rf is a linear or branched fluoroalkyl group having 1 to 21 carbon atoms, a fluoroalkenyl group having 1 to 21 carbon atoms, or a fluoroether group having total number of 1 to 200 of at least one repeating unit selected from the group consisting of —C$_3$F$_6$O—, —C$_2$F$_4$O— and —CF$_2$O—.

The monomer constituting the fluoropolymer may be an other monomer (C) in addition to the S-Sulfate monomer (A) and fluorine-containing monomer (B). Examples of the other monomer (C) include, for example, ethylene, vinyl acetate, vinyl halide (for example, vinyl chloride) vinylidene halide (for example, vinylidene chloride), acrylonitrile, styrene, benzyl(meth)acrylate, 2-hydroxyethyl(meth)acrylate, 2-hydroxypropyl(meth)acrylate, glycerol mono(meth)acrylate, polyethyleneglycol (meth)acrylate, polypropyleneglycol (meth)acrylate, methoxypolyethyleneglycol (meth)acrylate, methoxypolypropyleneglycol (meth)acrylate, tetrahydrofurfuryl (meth)acrylate, 3-chloro-2-hydroxypropyl(meth)acrylate, vinyl alkyl ketone, vinyl alkyl ether, isoprene, chloroprene and butadiene, to which the other monomer is not limited.

The other monomer (C) may a crosslinkable monomer. The crosslinkable monomer may be a fluorine-free compound having at least two reactive groups and/or carbon-carbon double bonds. The crosslinkable monomer may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl (meth)acrylate, N,N-diethylaminoethyl (meth) acrylate, butadiene, chloroprene and glycidyl (meth)acrylate, to which the crosslinkable monomer is not limited.

In the fluorine-containing polymer, the amount of the S-Sulfate monomer (A) may be from 0.1 to 50 parts by weight, for example, from 0.1 to 20 parts by weight, particularly from 1 to 10 parts by weight, and the amount of the other monomer (C) may be from 0 to 40 parts by weight, for example, from 0 to 20 parts by weight, particularly from 0.1 to 15 parts by weight, based on 100 parts by weight of the fluorine-containing monomer (B).

The weight-average molecular weight of the fluorine-containing polymer may be, for example, from 2,000 to 5,000,000, particularly, from 3,000 to 5,000,000, especially from 10,000 to 1,000,000. The weight-average molecular weight of the fluorine-containing polymer can be measured by gel permeation chromatography (GPC) (in terms of polystyrene).

The fluorine-containing polymer can be produced, for example, as follows:

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is desirable that the monomers are dispersed in water by using an emulsifying device capable of applying a strong shearing energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. An anionic and/or cationic and/or nonionic emulsifying agent is preferably used. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers. The surface treatment agent of the present invention is preferably in the form of a solution, an emulsion or an aerosol. The surface treatment agent generally comprises the fluorine-containing polymer and a medium (particularly a liquid medium such as an organic solvent and/or water). The concentration of the fluorine-containing polymer (B) in the surface treatment agent may be, for example, from 0.1 to 50% by weight.

The surface treatment agent of the present invention can be applied by a know procedure to a substrate to be treated. Usually, the treatment agent is diluted or dispersed with an organic solvent or water, is adhered to surfaces of the substrate by a well-known procedure such as an immersion coating, a spray coating and a foam coating, and is dried. If necessary, the surface treatment agent is applied together with a suitable crosslinking agent, followed by curing. It is also possible to add, for example, other surface treatment agents (for example, a water repellent agent and an oil repellent agent), or mothproofing agents, softeners, antimicrobial agents, flame retardants, antistatic agents, paint fixing agents and crease-proofing agents to the surface treatment agent of the present invention. For the immersion coating, the concentration of the fluorine-containing polymer in an immersion treatment liquid may be from 0.05 to 10% by weight, based on the treatment liquid. For the spray coating, the concentration of the fluorine-containing polymer in the treatment liquid may be from 0.1 to 5% by weight, based on the treatment liquid. A stain blocker may be used together. When the stain blocker is used, it is preferable to use an anionic emulsifier or a nonionic surfactant.

The substrate to be treated with the surface treatment agent (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile may be particularly a carpet. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The treatment agent of the present invention can be suitably used for carpet made from nylon and/or polypropylene.

The textile may be in any form such as a fiber, a yarn and a fabric. When the carpet is treated with the surface treatment agent of the present invention, the carpet may be formed after treating fibers or yarns with the surface treatment agent, or the formed carpet may be treated with the surface treatment agent.

The term "treatment" means that the treatment agent is applied to the substrate by, for example, immersion, spray or coating. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof.

The tests were conducted as follows:

1. Shower Water Repellency Test

Shower water repellency test was conducted according to JIS-L-1092. The shower water repellency was expressed by water repellency No. (as shown in the below-described Table 1). The suffix "+" attached to the numeral value means that the performance is slightly better than the performance indicated by said numeral value.

TABLE 1

| Water repellency No. | State |
| --- | --- |
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Water-Repellency Test

A treated cloth is stored in a thermo-hygrostat having a temperature of 21° C. and a humidity of 65% for at least 4 hours. A test liquid (isopropyl alcohol (IPA), water, and a mixture thereof, as shown in Table 2) which has been also stored at 21° C. is used. The test is conducted in an air-conditioned room having a temperature of 21° C. and a humidity of 65%. Five droplets (each in an amount of 0.05 mL) of the test liquid are softly dropped on the test cloth by a micropipette. If 4 or 5 droplets remain on the test cloth after standing for 10 seconds, the test liquid passes the test. The water repellency is expressed by a point corresponding to a maximum content (% by volume) of isopropyl alcohol (IPA) in the test liquid which passes the test. The water repellency is evaluated as twelve levels which are Fail, 0, 1, 2, 3, 4, 5, 6, 7, 8, 9 and 10 in order of a poor level to an excellent level.

TABLE 2

| | Water-repellency test liquid | |
| --- | --- | --- |
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Oil Repellency Test

A treated cloth is stored in a thermo-hygrostat having a temperature of 21° C. and a humidity of 65% for at least 4 hours. A test liquid (shown in Table 3) which has been also stored at 21° C. is used. The test is conducted in an air-conditioned room having a temperature of 21° C. and a humidity of 65%. Five droplets (each in an amount of 0.05 mL) of the test liquid are softly dropped on the test cloth by a micropipette. If 4 or 5 droplets remain on the test cloth after standing for 30 seconds, the test liquid passes the test. The oil repellency is expressed by a maximum point of the test liquid which passes the test. The oil repellency is evaluated as nine levels which are Fail, 1, 2, 3, 4, 5, 6, 7 and 8 in order of a poor level to an excellent level.

TABLE 3

| Point | Test liquid | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

Oil repellency test liquid

Monomers were synthesized as follows.

Synthetic Example 1

Preparation of 2-Bromoethyl Methacrylate

An egg-plant type flask which contained benzene (500 ml) was charged with 2-bromoethanol (46.7 g, 0.37 mol) and triethylamine (29.1 g, 0.29 mol) and was capped with a rubber plug. Methacryloyl chloride (30 g, 0.29 mol) was added to the flask in ice water, using a syringe while being stirred with a stirrer. The stirring was continued for some time, and then, the mixture was warmed to a room temperature and was stirred overnight. Triethylamine hydrochloride was removed by suction filtration, and the mixture was washed three times with water (300 ml) to extract the unreacted substance. The mixture was transferred to a conical flask and was dried over anhydrous sodium sulfate. The mixture was concentrated by an evaporator under reduced pressure and purified by vacuum distillation to give a colorless and clear liquid (33.8 g) (yield: 61%).

The resultant product was identified by the IR spectrum.

Preparative Example 1

Preparation of BMS Monomer

An egg-plant type flask containing an aqueous solution of sodium thiosulfate pentahydrate (20 g, 81 mmol) in water (80 ml) was charged with a mixture of p-chloromethylstyrene (9.6 ml, 62 mmol) and 2-propanol (70 ml), and the resulting mixture was stirred at a room temperature overnight. The mixture was concentrated under reduced pressure to distil water off, and the precipitated crystals were removed by suction filtration. The crystals were put in an egg-plant type flask and were mixed with a small amount of water, and the mixture was heated and dissolved in a hot water bath of 65° C. The resulting aqueous solution was filtered, and the filtrate was cooled on ice for 2 hours to be recrystallized. After the suction filtration of the crystals, the crystals were dried in vacuum for 5 hours to give white crystals (11 g) (yield: 69%). The resultant product was found to be $H_2C=CH-Ph-CH_2—S—SO_3^-Na^+$ (BMS monomer) [wherein Ph is a p-phenylene group].

The product was identified by the melting point, IR spectrum, NMR spectrum and elemental analysis.

Preparative Example 2

Preparation of MMAS Monomer

A 300 ml egg-plant type flask containing water (60 ml) and 2-propanol (40 ml) was charged with sodium thiosulfate (7.0 g, 24.2 mmol) and hydroquinone (0.01 g, 0.09 mmol), and the mixture was stirred and dissolved. To the resulting solution was added 2-bromoethyl methacrylate (4.0 g, 20.7 mmol) prepared in Synthetic Example 1, and the mixture was stirred at a room temperature for 48 hours, and then, was concentrated by an evaporator under reduced pressure. To the concentrate were added ethanol (27.0 ml) and methanol (14.0 ml) to recrystallize the unnecessary salt. The mixture was again concentrated with the evaporator under reduced pressure. To the concentrate was added 2-propanol (60 ml), and the mixture was left to stand still at −4° C. overnight to be recrystallized. The resultant crystals were removed by suction filtration and were vacuum-dried in a desiccator to give white crystals (3.13 g) (yield: 61%). The product was found to be $H_2C=C(CH_3)—COO—CH_2CH_2—S—SO_3^-Na^+$ (MMAS monomer).

The product was identified by the melting point, Rf value, IR spectrum, $^1H$-NMR spectrum and $^{13}C$-NMR spectrum.

Preparative Example 3

Preparation of 9FCLA Monomer

A 200 ml four-necked flask was charged with 2-chloroacrylic acid (20 g, 0.19 mol), 2-(perfluorobutyl)ethanol (59.5 g, 0.23 mol), p-tolulenesulfonic acid (1.06 g, 0.0056 mol), t-butylcatechol (0.16 g, 0.001 mol) and cyclohexane (90 g, 1.07 mol) and was heated so that the inner temperature of the reactor reached 80° C., and a dehydrocondensation reaction was carried out by a Dean-Stark method. The reaction was continued for 16 hours. After the completion of the reaction, a small amount of brown precipitate in the reaction solution was filtered and was washed three times with water. Next, the solvent and an excess of 2-(perfluorobutyl)ethanol were removed by an evaporator to give a yellowish-brown liquid (46.86 g) (yield: 70.79%). The product was found to be $C_4F_9—(CH_2)_2OCOC(Cl)=CH_2$ (9FCLA monomer).

The product was identified by the $^1H$-NMR, $^{19}F$-NMR and $^{13}C$-NMR spectra.

Preparative Example 4

Preparation of 9FA/MMAS Copolymer

A 100 ml four-necked flask was charged with 2-(perfluorobutyl)ethyl acrylate (9FA) (R-1420 manufactured by Daikin Chemicals Sales Co., Ltd.) (8 g, 25 mmol), the monomer (MMAS monomer) synthesized in Preparative Example 2 (0.33 g, 1.32 mmol), 2-propanol (10.0 g), water (18.4 g) and azobisisobutyronitrile (4.32 mg, 0.026 mmol), and was deaired under reduced pressure. Next, the internal atmosphere of the system was displaced with nitrogen. The inner temperature was raised to 60° C., and the mixture was stirred for 15 hours. After the completion of the reaction, methanol was added to the polymer solution to deposit a white precipitate. The white precipitate was filtered under reduced pressure and dried in a vacuum desiccator to give white powder (5.6 g) (polymer yield: 67%). The product was identified by the IR spectrum (Chart 1). The IR spectral chart (Chart 1) is shown in FIG. 1.

The composition of the copolymer was almost the same as the composition of the charged monomers.

Preparative Example 5

Preparation of 9FMA/MMAS Copolymer

A 100 ml four-necked flask was charged with 2-(perfluorobutyl)ethyl methacrylate (9FMA) (M-1420 manufactured by Daikin Chemicals Sales Co., Ltd.) (8 g, 24.1 mmol), the monomer (MMAS monomer) synthesized in Preparative Example 2 (0.31 g, 1.27 mmol), 2-propanol (9.68 g), water (17.8 g) and azobisisobutyronitrile (4.17 mg, 0.025 mmol), and was deaired under reduced pressure. Next, the internal atmosphere of the system was displaced with nitrogen. The inner temperature was raised to 60° C., and the mixture was stirred for 15 hours. After the completion of the reaction, methanol was added to the polymer solution to deposit a white precipitate. The white precipitate was filtered under reduced pressure and dried in a vacuum desiccator to give white powder (6.24 g) (polymer yield: 75%). The product was identified by the IR spectrum (Chart 2). The IR spectral chart (Chart 2) is shown in FIG. 2.

The composition of the copolymer was almost the same as the composition of the charged monomers.

Preparative Example 6

Preparation of 9FCLA/MMAS Copolymer

A 100 ml four-necked flask was charged with the monomer (9FCLA) (6.7 g, 0.019 mol) synthesized in Preparative Example 3, the monomer (MMAS monomer) (0.248 g, 0.001 mol) synthesized in Preparative Example 2, dimethylformamide (15.2 g), water (4 g) and azobisisobutyronitrile (32.8 mg, 0.2 mmol), and was deaired under reduced pressure. Next, the inner atmosphere of the system was displaced with nitrogen. The inner temperature was raised to 60° C., and the mixture was stirred for 15 hours. After the completion of the reaction, methanol was added to the polymer solution to deposit a white precipitate. The white precipitate was filtered under reduced pressure and dried in a vacuum desiccator to give white powder (5.6 g) (polymer yield: 81%). The product was identified by the IR spectrum (Chart 3). The IR spectral chart (Chart 3) is shown in FIG. 3.

The composition of the copolymer was almost the same as the composition of the charged monomers.

Preparative Example 7

Preparation of 3FMA-MMAS Copolymer

An ampoule tube was charged with DMF (8.5 g) and water (2 g) to dissolve the monomer (MMAS monomer) (0.25 g, 1 mmol) synthesized in Preparative Example 2,2,2,2-trifluoroethyl methacrylate (3FMA) (M-1110 manufactured by Daikin Chemicals Sales Co., Ltd.) (1.53 g, 9 mmol) and azobisisobutyronitrile (16 mg, 0.1 mmol). The ampoule tube was deaired by freeze-decompression, displaced with nitrogen and sealed in vacuum. The ampoule tube was agitated at 60° C. for 20 hours. The reaction solution was poured into a large amount of water to deposit a white precipitate. The white precipitate was filtered in vacuum and dried in a vacuum desiccator to give a product (1.25 g) (polymer yield: 70%). The product was identified by the IR spectrum and the content of sulfur.

The composition of the copolymer was almost the same as the composition of the charged monomers [3FMA/MMAS=9/1 (in molar ratio)].

Preparative Example 8

Preparation of 3FMA-MMAS Copolymer

An ampoule tube was charged with DMF (8.5 g) and water (2 g) to dissolve the monomer (MMAS monomer) (0.57 g, 2.3 mmol) synthesized in Preparative Example 2,2,2,2-trifluoroethyl methacrylate (3FMA) (M-1110 manufactured by Daikin Chemicals Sales Co., Ltd.) (1.56 g, 9.2 mmol) and azoisobutyronitrile (18 mg, 0.11 mmol). The ampoule tube was deaired by freeze-decompression, displaced with nitrogen and sealed in vacuum. The ampoule tube was agitated at 60° C. for 20 hours. The reaction solution was poured into a large amount of water to deposit a white precipitate. The white precipitate was filtered in vacuum and dried in a vacuum desiccator to give a product (1.07 g) (polymer yield: 50%). The product was identified by the IR spectrum and the content of sulfur.

The composition of the copolymer was almost the same as the composition of the charged monomers [3FMA/MMAS=4/1 (in molar ratio)].

Preparative Example 9

Preparation of 3FMA-MMAS Copolymer

An ampoule tube was charged with DMF (8.5 g) and water (2 g) to dissolve the monomer (MMAS monomer) (0.99 g, 4 mmol) synthesized in Preparative Example 2,2,2,2-trifluoroethyl methacrylate (3FMA) (M-1110 manufactured by Daikin Chemicals Sales Co., Ltd.) (1.01 g, 6 mmol) and azoisobutyronitrile (16.4 mg, 0.1 mmol). The ampoule tube was deaired by freeze-decompression, displaced with nitrogen and sealed in vacuum. The ampoule tube was agitated at 60° C. for 20 hours. The reaction solution was poured into a large amount of water to deposit a white precipitate. The white precipitate was filtered in vacuum and dried in a vacuum desiccator to give a product (0.86 g) (polymer yield: 43%). The product was identified by the IR spectrum and the content of sulfur.

The composition of the copolymer was almost the same as the composition of the charged monomers [3FMA/MMAS=1.5/1 (in molar ratio)].

Preparative Example 10

Preparation of 3FMA-MMAS Copolymer

An ampoule tube was charged with DMF (8.5 g) and water (2 g) to dissolve the monomer (MMAS monomer) (1.24 g, 5 mmol) synthesized in Preparative Example 2,2,2,2-trifluoroethyl methacrylate (3FMA) (M-1110 manufactured by Daikin Chemicals Sales Co., Ltd.) (0.84 g, 5 mmol) and azoisobutyronitrile (16.4 mg, 0.1 mmol). The ampoule tube was deaired by freeze-decompression, displaced with nitrogen and sealed in vacuum. The ampoule tube was agitated at 60° C. for 20 hours. The reaction solution was poured into a large amount of water to deposit a white precipitate. The white precipitate was filtered in vacuum and dried in a vacuum desiccator to give a product (0.48 g) (polymer yield: 23%). The product was identified by the IR spectrum and the content of sulfur.

The composition of the copolymer was almost the same as the composition of the charged monomers [3FMA/MMAS=1/1 (in molar ratio)].

Preparative Example 11

Preparation of 3FMA-BMS Copolymer

A test tube was charged with water (3 g) and 2-propanol (8.9 g) to dissolve the monomer (BMS monomer) (0.063 g, 0.25 mmol) synthesized in Preparative Example 1, 2,2,2- trifluoroethyl methacrylate (M-1110 manufactured by Daikin Chemicals Sales Co., Ltd.) (1.4 g, 9.8 mmol) and azoisobutyronitrile (1.6 mg, 0.01 mmol). The test tube was deaired by freeze-decompression and displaced with nitrogen. The test tube was agitated at 60° C. for 30 hours. The reaction liquid was transferred to a dialyzing tube and was dialyzed over 4 hours using a mixture solution of distilled water and 2-propanol (5/5) as an external liquid. The dialysis was carried out total 3 times, while the external liquid was being replaced. The liquid was transferred to an egg-plant type flask and was freeze-dried (polymer yield: 76%). The product was identified by the IR spectrum, $^1$H-NMR spectrum and the content of sulfur.

The composition of the copolymer was almost the same as the composition of the charged monomers [3FMA/BMS=39/1 (in molar ratio)].

Preparative Example 12

Preparation of 3FMA-BMS Copolymer

A test tube was charged with water (3 g) and 2-propanol (8.9 g) to dissolve the monomer (BMS monomer) (0.13 g, 0.50 mmol) synthesized in Preparative Example 1, 2,2,2-trifluoroethyl methacrylate (M-1110 manufactured by Daikin Chemicals Sales Co., Ltd.) (1.37 g, 9.5 mmol) and azoisobutyronitrile (3.3 mg, 0.02 mmol). The test tube was deaired by freeze-decompression and displaced with nitrogen. The test tube was agitated at 60° C. for 30 hours. The reaction liquid was transferred to a dialyzing tube and was dialyzed over 4 hours using a mixture solution of distilled water and 2-propanol (5/5) as an external liquid. The dialysis was carried out total 3 times, while the external liquid was being replaced. The liquid was transferred to an egg-plant type flask and was freeze-dried (polymer yield: 63%). The product was identified by the IR spectrum, $^1$H-NMR spectrum and the content of sulfur.

The composition of the copolymer was almost the same as the composition of the charged monomers [3FMA/BMS=19/1 (in molar ratio)].

Preparative Example 13

Preparation of 3FMA-BMS Copolymer

A test tube was charged with water (3 g) and 2-propanol (8.9 g) to dissolve the monomer (BMS monomer) (0.25 g, 1.0 mmol) synthesized in Preparative Example 1, 2,2,2-trifluoroethyl methacrylate (M-1110 manufactured by Daikin Chemicals Sales Co., Ltd.) (1.29 g, 9.0 mmol) and azoisobutyronitrile (1.6 mg, 0.01 mmol). The test tube was deaired by freeze-decompression and displaced with nitrogen. The test tube was agitated at 60° C. for 30 hours. The reaction liquid was transferred to a dialyzing tube and was dialyzed over 4 hours using a mixture solution of distilled water and 2-propanol (5/5) as an external liquid. The dialysis was carried out total 3 times, while the external liquid was being replaced. The liquid was transferred to an egg-plant type flask and was freeze-dried (polymer yield: 84%). The product was identified by the IR spectrometry, $^1$H-NMR spectrum and the content of sulfur.

The composition of the copolymer was almost the same as the composition of the charged monomers [3FMA/BMS 9/1 (in molar ratio)].

Preparative Example 14

Preparation of 3FMA-BMS Copolymer

A test tube was charged with water (3 g) and 2-propanol (8.9 g) to dissolve the monomer (BMS monomer) (0.5 g, 2.0 mmol) synthesized in Preparative Example 1,2,2,2-trifluoroethyl methacrylate (M-1110 manufactured by Daikin Chemicals Sales Co., Ltd.) (1.15 g, 8.0 mmol) and azoisobutyronitrile (1.6 mg, 0.01 mmol). The test tube was deaired by freeze-decompression and displaced with nitrogen. The test tube was agitated at 60° C. for 30 hours. The reaction liquid was transferred to a dialyzing tube and was dialyzed over 4 hours using a mixture solution of distilled water and 2-propanol (5/5) as an external liquid. The dialysis was carried out total 3 times, while the external liquid was being replaced. The liquid was transferred to an egg-plant type flask and was freeze-dried (polymer yield: 84%). The product was identified by the IR spectrum, $^1$H-NMR spectrum and the content of sulfur.

The composition of the copolymer was almost the same as the composition of the charged monomers [3FMA/BMS=4/1 (in molar ratio)].

Comparative Preparative Example 1

Preparation of 9FA Homopolymer

A 100 ml four-necked flask was charged with 2-(perfluorobutyl)ethyl acrylate (9FA) (R-1420 manufactured by Daikin Chemicals Sales Co., Ltd.) (15 g, 0.047 mol) and tetrachlorohexafluorobutane (S-316 manufactured by Daikin Industries, Ltd.) (121.45 g) and was bubbled with nitrogen. Next, the gas phase was displaced with nitrogen for 30 minutes. The inner temperature was raised to 60° C., and a solution of PERBUTYL PV (1.61 g, 0.0092 mol) in trichloroethane (7.86 g) was added to carry out the reaction for 5 hours. The reaction step was monitored by gas chromatography, and the completion of the reaction was confirmed by observing the disappearance of the monomer peaks. After the completion of the reaction, methanol was added to the polymer solution to deposit a white starch syrup-like product. The supernatant was removed by decantation, and the solvent was distilled off by an evaporator. Then, a clear liquid compound having a very high viscosity (9.36 g) (polymer yield: 62%) was obtained. The polymer was identified by $^1$H-NMR, $^{19}$F-NMR, and $^{13}$C-NMR.

Comparative Preparative Example 2

Preparation of 9FMA Homopolymer

A 100 ml four-necked flask was charged with 2-(perfluorobutyl)ethyl acrylate (9FA) (R-1420 manufactured by Daikin Chemicals Sales Co., Ltd.) (30 g, 0.085 mol) and tetrachlorohexafluorobutane (S-316 manufactured by Daikin Industries, Ltd.) (242 g) and was bubbled with nitrogen. Next, the gas phase was displaced with nitrogen for 30 minutes. The inner temperature was raised to 60° C., and a solution of PERBUTYL PV (3.22 g, 0.013 mol) in trichloroethane (15.7 g) was added to carry out the reaction for 5 hours. The reaction step was monitored by gas chromatography, and the completion of the reaction was confirmed by observing the disappearance of the monomer peaks. After the completion of the reaction, methanol was added to the polymer solution to deposit a white starch syrup-like product. The supernatant was removed by decantation, and the solvent was distilled off by an evaporator. Then, a clear liquid compound having a very high viscosity (20.2 g) (polymer yield: 67%) was obtained. The polymer was identified by $^1$H-NMR, $^{19}$F-NMR, and $^{13}$C-NMR.

Comparative Preparative Example 3

Preparation of 9FCLA Homopolymer

A 100 ml four-necked flask was charged with the monomer (9FCLA) (40 g, 0.11 mol) synthesized in Preparative Example 3 and butyl acetate (108 g) and was bubbled with nitrogen. Next, the gas phase was displaced with nitrogen for 30 minutes. The inner temperature was raised to 60° C., and a solution of PERBUTYL PV (0.44 g, 0.011 mol) in butyl acetate (0.8 g) was added to carry out the reaction for 5 hours. The reaction step was monitored by gas chromatography, and the completion of the reaction was confirmed by observing the disappearance of the monomer peaks. After the completion of the reaction, methanol was added to the polymer solution to deposit a white solid. The supernatant was removed by decantation, and the solvent was distilled off by an evaporator. Then, white powder (34.8 g) (polymer yield: 87%) was obtained. The polymer was identified by $^1$H-NMR, $^{19}$F-NMR and $^{13}$C-NMR.

Comparative Preparative Example 4

Preparation of 3FMA Homopolymer

An ampoule tube was charged with DMF (10.1 g), 2,2,2-trifluoroethyl methacrylate (3FMA) (M-1110 manufactured by Daikin Chemicals Sales Co., Ltd.) (1.24 mg, 5 mmol) and azoisobutyronitrile (4.5 mg, 20 μmol), and the mixture was stirred and dissolved. The ampoule tube was deaired by freeze-decompression, displaced with nitrogen and sealed in vacuum. The ampoule tube was agitated at 60° C. in a thermostat for 20 hours. The reaction solution was poured into a large amount of water to reprecipitate a produced polymer. The polymer was washed twice with water and was dried in vacuum in a desiccator to give a polymer (4.9 g) (yield: 85%). The product was identified by the IR spectrum.

Example 1

The polymer (1.5 g) obtained in Preparative Example 4 was dissolved in ethyl acetate to form a test solution (150 g). One sheet of Nylon test cloth (510 mm×205 mm) was dipped in this test solution (150 g) for about 5 minutes, and the solvent was removed with a centrifugal dehydrator at 500 rpm for 30 seconds. The same operation was conducted on each one sheet of PET test cloth (510 mm×205 mm), PET/cotton blend test cloth (510 mm×205 mm) and cotton test cloth (510 mm×205 mm). Next, each test cloth was dried at 28° C. overnight.

Next, each one sheet of the Nylon test cloth, the PET test cloth, the PET/cotton blend test cloth and the cotton test cloth was treated at 150° C. for 3 minutes with a pin tenter, and was cut into halves (255 mm×205 mm). One half of the test cloth was subjected to a shower water repellency test, and the other half thereof was subjected to a water repellency test and an oil repellency test. The results of the tests are shown in Table 4.

Example 2

The polymer (1.5 g) obtained in Preparative Example 5 was dissolved in a solvent mixture of HCFC-225 and 2H-hexafluoro-2-propanol (A-7210 manufactured by Daikin Chemicals Sales Co., Ltd.) in the weight ratio 9/1 to form a test solution (150 g). One sheet of Nylon test cloth (510 mm×205 mm) was dipped in this test solution (150 g) for about 5 minutes, and the solvents were removed with a centrifugal dehydrator at 500 rpm for 30 seconds. The same operation was conducted on each one sheet of PET test cloth (510 mm×205 mm), PET/cotton blend test cloth (510 mm×205 mm) and cotton test cloth (510 mm×205 mm). Next, each test cloth was dried at 28° C. overnight.

Next, each one sheet of the Nylon test cloth, the PET test cloth, the PET/cotton blend test cloth and the cotton test cloth was treated at 150° C. for 3 minutes with a pin tenter, and was cut into halves (255 mm×205 mm). One half of the test cloth was subjected to a shower water repellency test, and the other half thereof was subjected to a water repellency test and an oil repellency test. The results of the tests are shown in Table 4.

Example 3

The polymer obtained in Preparative Example 6 was used for a treatment in the same manner as in Example 1, and then, a shower water repellency test, a water repellency test and an oil repellency test were conducted. The results are shown in Table 4.

Example 4

The polymer (0.25 g) obtained in Preparative Example 7 was dissolved in dimethylformamide (5 ml). This solution was cast onto a mold (40 mm×70 mm) made of a polypropylene sheet. The cast solution was dried for several days. A small piece of the resultant film was dipped in 2-propyl alcohol containing 5 wt % of iodine for an oxidation treatment. Next, this piece of the film was washed with a solvent which did not dissolve the same. The resultant film was dipped in each of dimethylformamide (DMF) and chloroform to observe the solubility thereof found before and after the oxidation treatment. The results are shown in Table 5.

Example 5

The polymer obtained in Preparative Example 8 was used for a treatment in the same manner as in Example 4, and the resultant film was dipped in each of dimethylformamide (DMF) and chloroform to observe the solubility thereof found before and after the oxidation treatment. The results are shown in Table 5.

Example 6

The polymer obtained in Preparative Example 9 was used for a treatment in the same manner as in Example 4, and the resultant film was dipped in each of dimethylformamide (DMF) and chloroform to observe the solubility thereof found before and after the oxidation treatment. The results are shown in Table 5.

Example 7

The polymer obtained in Preparative Example 10 was used for a treatment in the same manner as in Example 4, and the resultant film was dipped in each of dimethylformamide (DMF) and chloroform to observe the solubility thereof found before and after the oxidation treatment. The results are shown in Table 5.

Comparative Example 1

The polymer obtained in Comparative Preparative Example 1 was used for a treatment in the same manner as in Example 1, and the resultant cloth was subjected to a shower water repellency test, a water repellency test and an oil repellency test. The results are shown in Table 4.

Comparative Example 2

The polymer obtained in Comparative Preparative Example 2 was used for a treatment in the same manner as in Example 1, and the resultant cloth was subjected to a shower water repellency test, a water repellency test and an oil repellency test, respectively. The results are shown in Table 4.

Comparative Example 3

The polymer obtained in Comparative Preparative Example 3 was used for a treatment in the same manner as in Example 2, and the resultant cloth was subjected to a shower water repellency test, a water repellency test and an oil repellency test, respectively. The results are shown in Table 4.

Comparative Example 4

The polymer obtained in Comparative Preparative Example 4 was used for a treatment in the same manner as in Example 4, and the resultant film was dipped in each of dimethylformamide (DMF) and chloroform to observe the solubility thereof found before and after the oxidation treatment. The results are shown in Table 5.

TABLE 4

| Evaluation of performance | Ex. 1 | | | Ex. 2 | | | Ex. 3 | | |
|---|---|---|---|---|---|---|---|---|---|
| | Spray test | H$_2$O/IPA | Oil | Spray test | H$_2$O/IPA | Oil | Spray test | H$_2$O/IPA | Oil |
| PET | 50+ | 3 | 2 | 90 | 2 | 1 | 100+ | 5 | 3 |
| PET/cotton | 70 | 1 | 2 | 50 | 6 | 2 | 50 | 8 | 3 |
| Cotton | 0 | Fail | 4 | 50 | 6 | 1 | 50 | 5 | 2 |

| Evaluation of performance | Com. Ex. 1 | | | Com. Ex. 2 | | | Com. Ex. 3 | | |
|---|---|---|---|---|---|---|---|---|---|
| | Spray test | H$_2$O/IPA | Oil | Spray test | H$_2$O/IPA | Oil | Spray test | H$_2$O/IPA | Oil |
| PET | 50 | 2 | 1 | 80+ | 4 | 3 | 80 | 4 | 2 |
| PET/cotton | 50 | 0 | 2 | 50 | 3 | 4 | 50 | 7 | 3 |
| Cotton | 0 | Fail | 2 | 50 | 2 | 2 | 50 | 6 | 3 |

TABLE 5

| | | Before oxidation | After oxidation |
|---|---|---|---|
| Example 4 | DMF | Dissolved | Not dissolved |
| | Chloroform | Dissolved | Not dissolved |
| Example 5 | DMF | Dissolved | Swelled |
| | Chloroform | Dissolved | Not dissolved |
| Example 6 | DMF | Dissolved | Not dissolved |
| | Chloroform | Dissolved | Not dissolved |
| Example 7 | DMF | Dissolved | Not dissolved |
| | Chloroform | Dissolved | Not dissolved |

TABLE 5-continued

| | | Before oxidation | After oxidation |
|---|---|---|---|
| Comparative Example 4 | DMF | Dissolved | Dissolved |
| | Chloroform | Dissolved | Dissolved |

The invention claimed is:

1. A surface treatment agent comprising
   (I) a fluorine-containing polymer comprising:
   (A) repeating units derived from an S-Sulfate monomer having an —S—SO$_3$— group and a carbon-carbon double bond, and
   (B) repeating units derived from a fluorine-containing monomer having a fluoroalkyl group and carbon-carbon double bond, and
   (II) water and/or an organic solvent,
   wherein
   the amount of the monomer (A) is from 0.1 to 50 parts by weight, based on 100 parts by weight of the fluorine-containing monomer (B);
   the S-Sulfate monomer (A) is of the formula:

$$H_2C=CX\text{-}A\text{-}S—SO_3—Z$$

wherein X is a hydrogen atom, a methyl group, a fluorine atom, a chlorine atom, a bromine atom, an iodine atom, a CFX$^1$X$^2$ group wherein X$^1$ and X$^2$ respectively represent a hydrogen atom, a fluorine atom or a chlorine atom, a cyano group, a linear or branched fluoroalkyl group having 1 to 20 carbon atoms, a substituted or unsubstituted benzyl group, or a substituted or unsubstituted phenyl group;
   A is -Ph-Y— or —COO—Y—, wherein Ph is a phenylene group optionally having a substituent, Y is a direct bond, an C$_1$-C$_{10}$ aliphatic group optionally having an oxygen atom, a C$_6$-C$_{10}$ aromatic, cycloaliphatic or araliphatic group optionally having an oxygen atom, a —CH$_2$CH$_2$N(R$^1$)SO$_2$— group wherein R$^1$ is an alkyl group having 1 to 4 carbon atoms or a —CH$_2$CH(OY$^1$)CH$_2$— group wherein Y$^1$ is a hydrogen atom or an acetyl group, and Z is a hydrogen atom or a metal atom; and
   the fluorine-containing monomer (B) is of the formula:

$$CH_2=CX—COO—Y—Rf$$

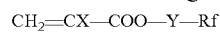

wherein X is a hydrogen atom, a methyl group, a fluorine atom, a chlorine atom, a bromine atom, an iodine atom, a cyano group, a substituted or unsubstituted benzyl group, or a substituted or unsubstituted phenyl group;

Y is a direct bond, an $C_1$-$C_{10}$ aliphatic group optionally having an oxygen atom, a $C_6$-$C_{10}$ aromatic, cycloaliphatic or araliphatic group optionally having an oxygen atom, a —$CH_2CH_2N(R^1)SO_2$— group wherein $R^1$ is an alkyl group having 1 to 4 carbon atoms, or a —$CH_2CH(OY^1)CH_2$— group wherein $Y^1$ is a hydrogen atom or an acetyl group, and Rf is a linear or branched fluoroalkyl group having 1 to 21 carbon atoms, a linear or branched fluoroalkenyl group having 1 to 21 carbon atoms, or a fluoroether group having total number of 1 to 200 of at least one repeating unit selected from the group consisting of —$C_3F_6O$—, —$C_2F_4O$— and —$CF_2O$—.

2. The surface treatment agent according to claim 1, wherein, in the fluorine-containing monomer (B), X is a fluorine atom, a chlorine atom, a bromine atom, an iodine atom, a cyano group, a substituted or unsubstituted benzyl group, or a substituted or unsubstituted phenyl group.

3. The surface treatment agent according to claim 1, wherein, in the fluorine-containing monomer (B), the fluoroalkyl group as the Rf group is a perfluoroalkyl group.

4. A surface treatment agent comprising
(I) a fluorine-containing polymer comprising:
  (A) repeating units derived from an S-Sulfate monomer having an —S—$SO_3$— group and a carbon-carbon double bond, and
  (B) repeating units derived from a fluorine-containing monomer having a fluoroalkyl group and carbon-carbon double bond, and
(II) water and/or an organic solvent,
wherein
the amount of the monomer (A) is from 0.1 to 50 parts by weight, based on 100 parts by weight of the fluorine-containing monomer (B);
the S-Sulfate monomer (A) is of the formula:

$H_2C=CX\text{-}A\text{-}S-SO_3-Z$ wherein X is a hydrogen atom, a methyl group, a fluorine atom, a chlorine atom, a bromine atom, an iodine atom, a $CFX^1X^2$ group wherein $X^1$ and $X^2$ respectively represent a hydrogen atom, a fluorine atom or a chlorine atom, a cyano group, a linear or branched fluoroalkyl group having 1 to 20 carbon atoms, a substituted or unsubstituted benzyl group, or a substituted or unsubstituted phenyl group;

A is -Ph-Y— or —COO—Y—, wherein Ph is a phenylene group optionally having a substituent, Y is a direct bond, an $C_1$-$C_{10}$ aliphatic group optionally having an oxygen atom, a $C_6$-$C_{10}$ aromatic, cycloaliphatic or araliphatic group optionally having an oxygen atom, a —$CH_2CH_2N(R^1)SO_2$— group wherein $R^1$ is an alkyl group having 1 to 4 carbon atoms or a —$CH_2CH(OY^1)CH_2$— group wherein $Y^1$ is a hydrogen atom or an acetyl group, and Z is a hydrogen atom or a metal atom; and the fluorine-containing monomer (B) is of the formula:

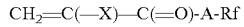
$CH_2=C(-X)-C(=O)\text{-}A\text{-}Rf$ wherein X is a hydrogen atom, a linear or branched alkyl group having 1 to 21 carbon atoms, a fluorine atom, a chlorine atom, a bromine atom, an iodine atom, a cyano group, a substituted or unsubstituted benzyl group, or a substituted or unsubstituted phenyl group;

A is —O—$Y^1$—, wherein $Y^1$ is an aliphatic group having 1 to 10 carbon atoms, an aromatic or cycloaliphatic group having 6 to 10 carbon atoms, a —$CH_2CH_2N(R^1)SO_2$—$(CH_2CH_2)_a$— group wherein $R^1$ is an alkyl group having 1 to 4 carbon atoms, and a is 0 or 1, a —$CH_2CH(OR^{11})CH_2$— group wherein $R^{11}$ is a hydrogen atom or an acetyl group, or —$(CH_2)_nSO_2$— group wherein n is 1 to 10, or —$Y^2$—[—$(CH_2)_m$—$Z$—]$_p$—$(CH_2)_n$— wherein $Y^2$ is —O— or —NH—; Z is —S— or —$SO_2$—; m is 1 to 10, n is 0 to 10, and p is 0 or 1, and Rf is a fluoroalkyl group having 1 to 21 carbon atoms, a fluoroalkenyl group having 1 to 21 carbon atoms, or a fluoroether group having total number of 1 to 200 of at least one repeating unit selected from the group consisting of —$C_3F_6O$—, $C_2F_4O$— and —$CF_2O$—.

5. The surface treatment agent according to claim 4, wherein, in the S-Sulfate monomer (A), X is a fluorine atom, a chlorine atom, a bromine atom, an iodine atom, a $CFX^1X^2$ group wherein $X^1$ and $X^2$ respectively represent a hydrogen atom, a fluorine atom or a chlorine atom, a cyano group, a linear or branched fluoroalkyl group having 1 to 20 carbon atoms, a substituted or unsubstituted benzyl group, or a substituted or unsubstituted phenyl group.

6. The surface treatment agent according to claim 4, wherein, in the S-Sulfate monomer (A), the Y group is —$(CH_2)_n$— wherein n is from 1 to 10.

7. The surface treatment agent according to claim 4, wherein, in the S-Sulfate monomer (A), Z is an alkaline metal.

8. The surface treatment agent according to claim 4, wherein, in the fluorine-containing monomer (B), X is a fluorine atom, a chlorine atom, a bromine atom, an iodine atom, a cyano group, a substituted or unsubstituted benzyl group, or a substituted or unsubstituted phenyl group.

9. The surface treatment agent according to claim 4, wherein, in the fluorine-containing monomer (B), the fluoroalkyl group as the Rf group is a perfluoroalkyl group.

10. The surface treatment agent according to claim 4, which is in the form of a solution, an emulsion or an aerosol.

11. A method of treating a substrate with the surface treatment agent according to claim 4, comprising a step of applying the surface treatment agent to the substrate.

12. The method according to claim 11, wherein the substrate is a textile, masonry, a filter, a dust protective mask, a fuel cell, glass, paper, wood, leather, fur, asbestos, brick, cement, metal and oxide, ceramics, plastics, a coated surface and a plaster.

13. A textile treated with the surface treatment agent according to claim 4.

14. A carpet treated with the surface treatment agent according to claim 4.

15. The surface treatment agent according to claim 4, which is a water and oil-repellent agent.

* * * * *